United States Patent
Sorokine et al.

(10) Patent No.: US 6,430,414 B1
(45) Date of Patent: Aug. 6, 2002

(54) SOFT HANDOFF ALGORITHM AND WIRELESS COMMUNICATION SYSTEM FOR THIRD GENERATION CDMA SYSTEMS

(75) Inventors: Vladislav Sorokine, San Diego; Qingxin Chen, Del Mar, both of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/474,450

(22) Filed: Dec. 29, 1999

(51) Int. Cl.[7] .................................................. H04Q 7/20

(52) U.S. Cl. .................................... 455/442; 455/432

(58) Field of Search ............................. 455/436, 437, 455/438, 439, 442, 226.2, 67.1, 513, 432; 370/331, 332

(56) References Cited

U.S. PATENT DOCUMENTS

| | | | | |
|---|---|---|---|---|
| 5,175,867 A | * | 12/1992 | Wejke et al. | 455/439 |
| 5,548,812 A | * | 8/1996 | Padovani et al. | 455/442 |
| 5,867,791 A | * | 2/1999 | Chambert | 455/525 |
| 5,999,522 A | * | 12/1999 | Rohani | 455/436 |
| 6,035,183 A | * | 3/2000 | Todd et al. | 455/226.2 |
| 6,195,342 B1 | * | 2/2001 | Rohani | 370/331 |

FOREIGN PATENT DOCUMENTS

| | | |
|---|---|---|
| EP | 0 504 122 A3 | 9/1992 |
| EP | 1 032 237 A1 | 8/2000 |
| WO | WO 95/12297 | 5/1995 |
| WO | WO 99/27657 | 6/1999 |
| WO | WO 99/27718 | 6/1999 |
| WO | WO 99/44386 | 9/1999 |

OTHER PUBLICATIONS

"Mobile station–Base station compatibility standard for wideband spread spectrum cellular systems," TIA/EIA Interim Standard, XP–002164766, pp. 7–133 to 7–146 (Feb. 3, 1999).

* cited by examiner

Primary Examiner—Doris H. To
Assistant Examiner—Eliseo Ramos-Feliciano
(74) Attorney, Agent, or Firm—Philip Wadsworth; Charles Brown; Kevin Cheatham

(57) ABSTRACT

A method and apparatus for providing an improved soft handoff algorithm in a wireless communication system for third generation code division multiple access ("CDMA") systems. The method comprises establishing communication between the wireless communication device and the at least one serving base station, the at least one serving base station having a list of at least one neighboring base station which neighbors the respective serving base station, monitoring the reverse channel signal strength at the wireless communication device from at least one neighboring base station, transmitting to a base station controller the wireless communication device signal strength detected at each neighboring base station, compiling at the base station controller a list of effective neighboring base stations from the at least one neighboring base station based on the monitored wireless communication device signal strength, transmitting the list of effective neighboring base stations to each at least one serving base station, periodically transmitting a neighboring base station list update message to the wireless communication device, the neighboring base station list update message including the effective neighboring base station list, storing the effective neighboring base station list as a neighbor set in the wireless communication device, performing forward channel signal strength searching of the neighbor set in the wireless communication device after storing the effective neighbor list as the neighbor set, and monitoring the signals from the effective neighboring base stations to accomplish a handoff between the at least one service base station and the receiving neighboring base station.

8 Claims, 4 Drawing Sheets

SOFT HANDOFF ALGORITHM AND WIRELESS COMMUNICATION SYSTEM FOR THIRD GENERATION CDMA SYSTEMS

BACKGROUND OF THE INVENTION

1. Field of the Invention

The, present invention relates to cellular telephone systems. More specifically, the present invention relates to a novel and improved system for providing more efficient soft handoffs in a code division multiple access ("CDMA") cellular telephone system to accommodate uninterrupted voice and high data rate transmission.

2. Description of Related Art

The next generation of wireless networks will provide multiple services requiring high data rate transmission and uninterrupted connections. This next generation is often referred to as the "third generation" of CDMA wireless systems. The range of services include text paging, two-way radio connections, internet connectivity using microbrowsers, two-way wireless e-mail capability and wireless modem functionality. The CDMA cellular telephone system offers the capability to provide reliable radio links between a wireless communications device such as a mobile station ("MS") and a base station ("BS") with a much higher data capacity than conventional networks that only support voice service. As an example, in the third generation CDMA wireless systems, radio links supporting high rate (up to 2 Mbps) data transmissions will be established between the MS and the BS to provide multimedia services such as Internet access.

One particularly important feature of CDMA systems for effective third generation wireless communication is the soft handoff, which allows the MS to move smoothly from the coverage of one cell to another without interruption. The soft handoff is accomplished by establishing simultaneous communications between the MS and multiple base stations. A soft handoff is illustrated in FIG. 1. A MS 10 passes to the edge of the coverage area 12a of a serving BS 12.

While the MS 10 is within a serving BS coverage area 12a and a receiving BS 14 coverage area 14a, both base stations 12, 14 simultaneously communicate with the MS 10. As the MS 10 passes further into the coverage area 14a of the receiving BS 14, the server BS 12 stops communicating with the MS 10. In this manner, there is uninterrupted communication for the user of the MS 10 as he or she passes from the serving cell to the receiving cell. An efficient soft handoff algorithm plays an important role in maintaining the link quality as well as conserving the capacity-related network resources. As the demand to support high rate data services increases, the need to improve the efficiency of the handoff algorithm becomes more critical.

For a third generation system based on CDMA technologies, a highly efficient handoff algorithm is essential to successfully provide the infrastructure to support the new range of services. A conventional protocol for soft handoffs in a CDMA system has been adopted by the Telecommunications Industry Association in the industry standards IS-95, IS-95A or IS-95B (collectively "IS-95 A/B") for implementing a CDMA cellular system. Under the IS-95 A/B standard, a MS communicates with one or more base stations dispersed in a geographic region. Each BS continuously transmits a pilot channel signal having the same spreading code but with a different code phase offset. Phase offset allows the pilot signals to be distinguished from one another, which in turn allows the base stations to be distinguished. Hereinafter, a pilot signal of a BS will be simply referred to as a pilot. The MS monitors the pilots and measures the received energy of the pilots.

The IS-95 A/B standards define a number of states and channels for communication between the MS and the BS. For example, in the Mobile Station Control on the Traffic State, the BS communicates with the MS over a Forward Traffic Channel, and the MS communicates with the BS over a Reverse Traffic Channel. During a call, the MS must constantly monitor and maintain four sets of pilots Collectively referred to as the Active Set, the Candidate Set, the Neighbor Set, and the Remaining Set. The Active Set comprises pilots associated with the Forward Traffic Channel assigned to the MS. The Candidate Set comprises pilots that are not currently in the Active Set but have been received by a particular MS with sufficient strength to indicate that the associated Forward Traffic Channel could be successfully demodulated. The Neighbor Set comprises pilots that not currently in the Active Set or Candidate Set but are likely candidates for handoff. The Remaining Set comprises all possible pilots in the current system on the current CDMA frequency assignment, excluding the pilots in the Neighbor Set, the Candidate Set, and the Active Set.

The MS constantly searches the Pilot Channel of neighboring base stations for a pilot that is sufficiently stronger than a threshold value. As the MS moves from the region covered by one BS to another, the MS promotes certain pilots from the Neighbor Set to the Candidate Set, and notifies the BS or base stations of the promotion via a Pilot Strength Measurement Message ("PSMM"). The BS determines an Active Set according to the PSMM, and notifies the MS of the new Active Set via a Handoff Direction Message. When the MS commences communication with a new BS in the new Active Set before terminating communications with the old BS, a "soft handoff" has occurred.

In IS-95 A/B compliant CDMA systems, each BS is identified by the pseudo-random ("PN") offset of its pilot channel signal. The details of the PN offset identification procedures in IS-95 A/B are well known to those of ordinary skill in the art and are therefore not discussed further herein. The MS categorizes all pilots into different sets based on the pilot's likelihood to be used as a candidate for handoff.

The value T_ADD consists of the pilot strength threshold specified by the BS (IS-95 A) or dynamically determined at the MS (IS-95 B), above which the pilot is considered sufficiently strong to be added to the Active Set. The value T_DROP reflects the pilot strength threshold below which the pilot is considered sufficiently weak to be removed from the Active Set. The PSMM is sent from the MS to the BS to report the strength of all pilots in the Active and Candidate Sets. In response to the PSMM, an Extended Handoff Direction Message ("EHDM") which includes an updated Active Set is sent from the BS to the MS.

The IS-95 A/B compliant MS typically has a searcher unit that continuously measures the pilots in various sets and reports to the BS the pilots that are sufficiently strong for an addition to the Active Set, and the pilots that are relatively weak to be removed from the Active Set. Pilots in the Neighbor Set are of particular importance, and normally they are more frequently measured than pilots in the Remaining Set.

The procedure of adding a pilot from the Neighbor Set to the Active Set in the IS-95 A/B soft handoff algorithm is briefly described as follows:

1. Each BS has a stored Neighbor List ("NL") in terms of the PN offsets and configuration information of the neighboring cells. The MS receives a Neighbor List Update Message ("NLUM") containing the NL from the BS and places the corresponding pilots into the Neighbor Set.

2. The MS is required to perform continuous measurement of the pilot channel strength of every pilot in the Neighbor Set using its searcher unit.

3. The MS compares the measured pilot strength with the T_ADD. Those neighbor pilots whose strengths are above T_ADD are placed in the Candidate Set and the PSMM is sent to the BS.

4. Based on the content of the PSMM and the availability of the network resources, the BS sends an EHDM to the MS indicating a new Active Set.

A similar reporting procedure is followed when the MS needs to delete a pilot from its Active Set. In this case, the strength of a pilot in the Active Set is compared with the threshold T_DROP and a timer T_TDROP is activated whenever the pilot strength decreases below T_DROP. Upon the expiration of T_TDROP, a PSMM is sent to the BS and the BS usually responds with an EHDM indicating a reduced Active Set.

According to the IS-95 A/B standard, when the MS receives a NLUM, it increments a counter corresponding to each pilot in the Neighbor Set and adds to the Neighbor Set each pilot named in the NLUM, if such pilot is not already a pilot of the Candidate Set or Neighbor Set. If the MS can store in the Neighbor Set only "k" additional pilots and more than "k" new pilots were sent in the NLUM, the MS 10 stores the first "k" new pilots listed in the message. More details regarding the maintenance of the Neighbor Set are found in the IS-95 A/B standards.

A more complete description of compatibility requirements for handoffs is found in the IS-95 A/B standards, and such information is incorporated herein by reference. Under the IS-95A standard, the pilot strength threshold is specified by the BS as part of an overhead information operation wherein the BS sends system parameter data to the MS periodically. As part of the overhead signal, a System Parameters Message from the BS to the MS includes the pilot detection threshold T_ADD. More details regarding the overhead information are found in Section 6.6.2.2 "Response to Overhead Information Operation" of IS-95A, which is incorporated herein by reference. In the IS-95 B standard, the pilot strength threshold is dynamically determined at the MS. The relevant portions of IS-95 B which further discuss how the pilot strength threshold is dynamically determined are incorporated herein by reference.

The present soft hand-off algorithm does not provide soft-handoffs sufficiently efficient for third generation wireless services, however. Typically, the Neighbor List sent by the BS is a static list that is determined at the time the network system is deployed. It contains a list of the neighbor pilots that could be possibly "seen" within the cell coverage. In the IS-95 A standard, the minimum supported Neighbor Set size is 20 pilots, as represented by the $N_{8m}$ constant in Appendix D of IS-95 A. In the IS-95 B standard, the minimum supported size of the Neighbor Set is 40. It is not uncommon for the BS to send a NL with the maximum number of neighbor pilots just to be on the safe side, especially in a poorly optimized network.

Since the Neighbor Set pilots are the most likely handoff candidates, the frequency and the accuracy of the Neighbor Set pilot measurements greatly affects the handoff performance. However, the MS typically only has limited signal processing capabilities due to its power, size and cost constraints. Passing a large NL to the MS means that the MS has to distribute its limited searcher power among many pilots which may (and typically does) result in the poorer estimation of every pilot. A reduced sampling rate for each pilot inhibits the MS's ability to estimate the strength of each pilot accurately. Link failures occur more frequently due to missed detections of fast time-varying pilots.

In the current handoff procedure, the BS makes the handoff decision based only on the MS's measurement reports of the forward link pilot channel strength (F-PICH). A handoff procedure is usually triggered by the PSMM sent from the MS when it sees a pilot with sufficiently strong or weak strength. Although there exists a mechanism by which the BS can autonomously order the MS to send a PSMM, the BS solely relies on the MS's ability to estimate and report the strength of its surrounding pilots to make handoff decisions.

There are at least three factors that could lead to the degradation in performance in the handoff algorithm. First, compared with the BS, the MS's processing power is more restrictive which limits its pilot searching ability, especially when it has to search a large number of pilots as a result of un-optimized NL. Second, the time spent in sending the PSMM and waiting for an EHDM can sometimes be too long for the MS to react to rapid variations of the radio link conditions. Third, the forward link quality only approximately reflects the reverse link quality. Therefore, a handoff decision based only on the F-PICH measurements may not avoid failures caused by the reverse link degradation.

Attempts have been made to improve the soft-handoffs in a CDMA system. For example, U.S. Pat. No. 5,920,550, to William D. Willey, ("'550 patent"), assigned to the assignee of the present invention and whose contents are incorporated herein by reference, teaches providing at least one of the current measured pilot signal strengths to the BS in each access probe. The system then specifies the base stations for soft handoff according to the current measured pilot signal strengths. The '550 patent, while improving a soft-handoff operation by reporting the current pilot strength in access probes subsequent to the System Access State, nevertheless fails to further provide the necessary efficiency and uninterrupted service that is necessary for third generation wireless communications. The '550 patent teaches receiving a large-sized NL from the BS as indicated in the IS-95 A/B standard. Although a current pilot strength will be reported in subsequent access probes, the '550 patent teaches distributing the MS limited searcher power among many pilots which may (and typically does) result in the poorer estimation of every pilot.

Another attempt to improve the soft handoff in a CDMA system is found in U.S. Pat. No. 5,854,785, to William D. Willey ("785 patent" ), assigned to the assignee of the present invention and which contents are incorporated herein by reference. The '785 patent teaches improving the soft handoff by measuring the neighbor pilot strengths while in the System Access Mode and providing the identities of the base stations corresponding to the measured pilot strengths to the system in the initial access probe. The system uses the neighboring BS identities and pilot signal strengths to determine which neighboring BS has sufficient measured pilot strength so that an associated Paging Channel may be successfully demodulated. Thus, during a soft handoff, the MS demodulates the paging channel from at least one neighboring pilot as well as the MS's currently active pilot.

The '785 patent still fails to provide the necessary capability for third generation wireless applications. Although a paging channel message will be demodulated from a neighboring BS with a sufficient pilot strength, the '785 patent teaches distributing the MS limited searcher power among many pilots which may (and typically does) result in the poorer estimation of every pilot.

The cdma 2000 family of standards were established to accommodate the third generation wireless communication systems. The family of standards include: IS-2000-1; IS-2000-2; IS-2000-3; IS-2000-4; IS-2000-5; and IS-2000-6. Each of these standards specifies a portion of a spread spectrum radio interface that uses CDMA technology and/or analog dual-mode technology for mobile stations and base stations. The cdma2000 standards are backward compatible with IS-95 B.

Many new features have been introduced in the cdma2000 proposal in an effort to further increase the system capacity. One of the features is the reverse link pilot channel transmitted by each MS in the traffic state. The reverse pilot channel is an unmodulated spread spectrum signal which is used to assist the BS in detecting a MS transmission. When in the traffic state, the MS communicates with the BS using the forward and reverse traffic channels. Adding the reverse pilot channel enables coherent detection of the mobile transmit signal at the BS and allows the system to implement fast forward link power control. The fast forward link power control is implemented by the MS inserting a reverse power control sub-channel on the reverse pilot channel.

The IS-2000-2 portion of the cdma2000 family of standards defines the physical layer standard for cdma2000 spread spectrum systems. In this specification, the structure of the reverse pilot channel includes a power control group consisting of the reverse pilot channel signal contained in the first 1152×N PN chips, and the reverse power control sub-channel in the following 384×N PN chips, where N is the spreading rate number. For example, N=1 for spreading rate 1 and N=3 for spreading rate 3. More details regarding the reverse power control sub-channel are found in Section 2.1.3.1.10 (and subsections) of IS-2000-2 which is incorporated herein by reference.

Although the cdma2000 family of standards provide some benefits through increasing system capacity and by providing reverse pilot strength measurements, the standards still fail to provide sufficiently efficient soft handoffs with uninterrupted data transmission. Therefore, the IS-95 A/B standards and the cdma2000 family of standards do not adequately address providing uninterrupted voice and data transmission during a soft handoff between a MS and a BS.

SUMMARY OF THE INVENTION

What is needed in the art is a CDMA system which improves the efficiency and uninterrupted connection between a MS and a BS during a soft handoff. The invention disclosed and claimed herein improves the existing soft handoff algorithm by using the reverse pilot strength measurements at the BS as defined in the cdma2000 standard IS-2000-2 to optimize the neighbor list. The optimization leads to enhanced handoff efficiency measured by the MS's speed to handoff and its usage of network resources.

The field data collected during field trials for CDMA markets indicates that in a properly optimized network that the number of pilots with sufficient strength (Ec/Io>−14 dB in most cases) "seen" by a particular MS should be no more than 3. Even in a poorly optimized network subject to pilot pollution, the number of competing pilots at any given time and location is at most 6. Thus, the present algorithm unnecessarily requires the MS to frequently monitor more neighboring base stations than is necessary or efficient.

To address the deficiencies described above, the present invention comprises a method of handing off a wireless communication device between at least one serving cell and a receiving neighboring cell in a wireless communication system. The method comprises:

(1) establishing a call between the wireless communication device and the at least one serving cell, the at least one serving cell having a list of at least one neighboring cell which neighbors the respective serving cell;

(2) monitoring the reverse channel signal strength received from the wireless communication device from at least one neighboring cell;

(3) transmitting to a BS controller the wireless communication device signal strength detected at each neighboring cell;

(4) compiling at the BS controller a list of effective neighboring cells from the at least one neighboring cell based on the monitored wireless communication device signal strength;

(5) transmitting the list of effective neighboring cells to each at least one serving cell;

(6) periodically sending a neighboring cell list update message to the wireless communication device, the neighboring cell list update message including the effective neighboring cell list;

(7) storing the effective neighboring cell list as a neighbor set in the wireless communication device;

(8) performing forward channel signal strength searching of the neighbor set in the wireless communication device after storing the effective neighbor list as the neighbor set; and (9) monitoring the signals from the effective neighboring cells to accomplish a handoff between the at least one service cell and the receiving neighboring cell.

Although the above steps are numbered, they do not need to be practiced the above order. The invention also includes a wireless communication system comprising:

a wireless communication device which communicates with a serving cell;

at least one cell neighboring the serving cell which monitors a reverse channel signal strength from the wireless communication device; and a BS controller which compiles a list of effective neighboring cells from the at least one cell neighboring the serving cell based on the monitored wireless communication device signal, the BS controller communicating the list of effective neighboring cells to the serving cell, wherein the serving cell periodically sends a neighbor list update message containing the list of effective neighboring cells to the wireless communication device and the wireless communication device stores the list of effective neighboring cells as the neighbor set and performs forward channel searches on the updated neighbor set.

One of ordinary skill in the art will understand that the communication system requires other infrastructure equipment which is not shown, such as equipment for switching, call routing, and the like.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

In the cdma2000 family of standards, each MS sends reverse-link channel strength signal on the reverse pilot channel ("R-PICH") in the Traffic State to the BS which provides the BS with the opportunity to collect more information on the MS's RF environment. Each MS supports both an inner power control loop and an outer power control loop for forward traffic channel power control. The outer power control loop estimates a setpoint value based on Eb/Nt to achieve a target frame error rate ("FER") on each assigned forward traffic channel. These setpoints are communicated to the BS either implicitly or through signal messages. The differences between these set points helps the BS derive the appropriate transmit levels for the forward traffic channels that do not have inner loops.

The inner power control loop compares the $E_b/N_t$ of the received forward traffic channel with the corresponding output power control loop setpoint to determine the value of the power control bit to be sent to the BS on the forward power control subchannel. The present invention involves improving the existing algorithm by dynamically optimizing the NL, providing an autonomous EHDM for a faster handoff, and allowing the BS to direct the forward channel pilot strength (F-PICH) search by the MS.

Variations of the received signal at the MS result from the multi-path propagation, shadow fading and the path loss. While multi-path fading exhibits short-term effects and is mostly un-correlated between the forward link and the reverse link, shadow fading and path loss incur longer-term variations in the received signal strength and are generally considered highly correlated between the forward and reverse links. An IS-95 A/B CDMA system uses the RAKE receiver to tackle short-term channel variations caused by the multi-path fading. The soft handoff algorithm is designed to overcome long-term channel variations caused by shadow fading and path loss.

Figure 1:
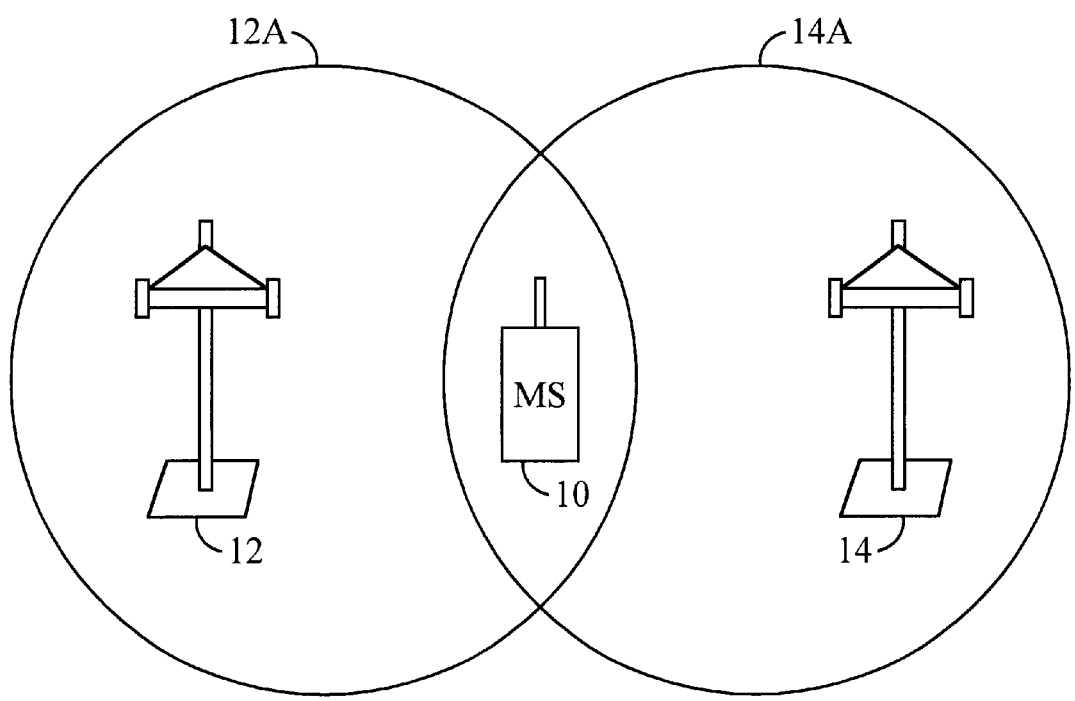
FIG. 1 illustrates generally a soft handoff procedure.
Figure 2:
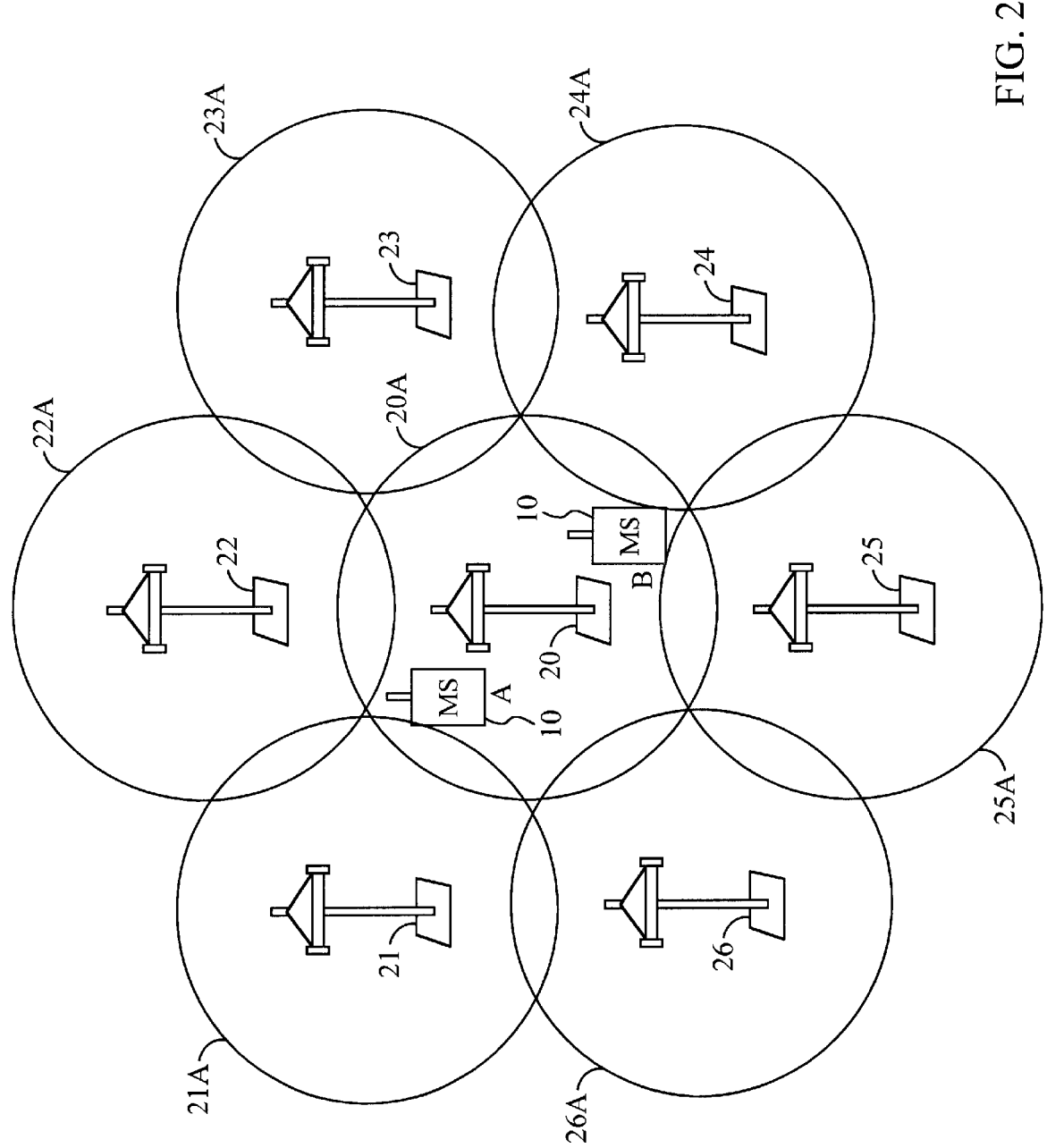
FIG. 2 illustrates the development of the effective neighbor set as a MS travels through a serving cell.

As shown in FIG. 2, as the MS 10 moves from a position A to position B within the cell 20a served by BS 20, the "effective set" of neighbors changes. Cells 21a, 22a, and 23a may be the correct candidates for handoff at location A but cells 24a, 25a, and 26a are better candidates when the MS 10 moves to location B. With the cdma2000 and IS/95 A/B algorithms, the MS 10 most likely will receive a NL from the serving BS 20 consisting of pilots for BSs 21, 22, 23, 24, 25 and 26 plus other pilots in the neighborhood regardless of its location with respect to neighboring cells.

Figure 3:
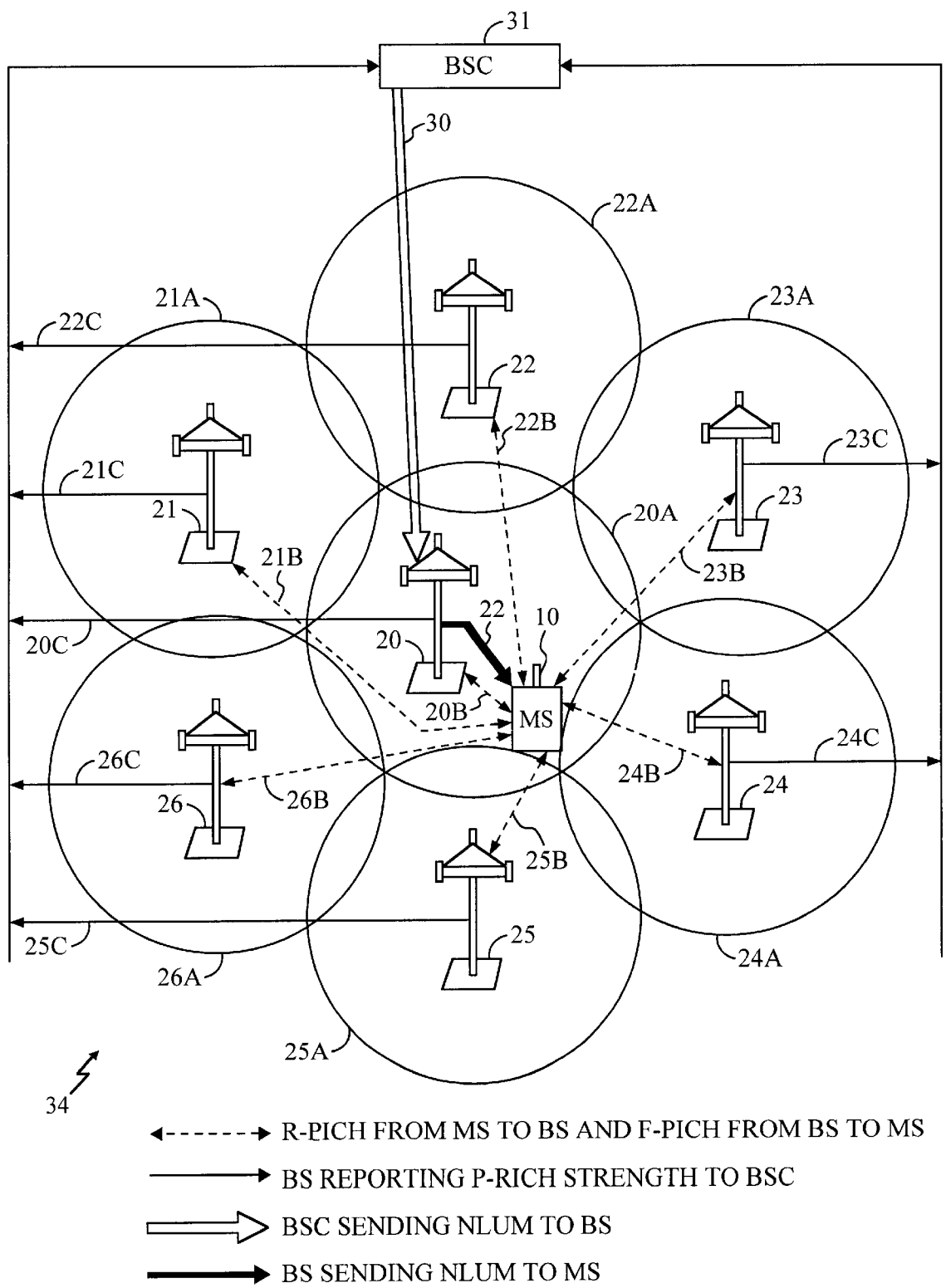
FIG. 3 illustrates the formation and communication of a neighbor list update message from a BS controller to a MS.

A preferred embodiment of the present invention is illustrated in FIG. 3. A method for optimizing the NL comprises establishing a call between a MS 10 and serving BS 20, which has a stored NL of its neighboring cells 21a, 22a, 23a, 24a, 25a and 26a. The Base Station Controller ("BSC") 31 informs all the cells in NL to monitor the R-PICH signal strength of the MS 10 and report it to the BSC 31. Accordingly, each neighboring BS 21, 22,,23, 24, 25 and 26 monitors the R-PICH signal from the wireless communication device or MS 10 and transmits the R-PICH data 20c, 21c, 22c, 23c, 24c, 25c, and 26c to the BSC 31. The BSC 31 processes the R-PICH measurements from the NL members 21a, 22a, 23a, 24a, 25a and 26a and compares each respective R-PICH data with a pre-determined threshold, which preferably is lower than T_ADD. It is understood that the pre-determined threshold may also be some other value unrelated to T_ADD.

Based on the analysis of the R-PICH data, the BSC 31 compiles an effective neighbor list ("ENL") consisting of those base stations that report sufficiently strong R-PICH measurements from the wireless communication device or MS 10. The threshold levels for what is determined to be "sufficiently strong" are based on a predetermined strength arrived at using various factors known to those of ordinary skill in the art. The BSC 31 transmits the ENL data 30 to BS 20 which is serving the MS 10. Periodically, BS 20 sends a Neighbor List Update Message (NLUM) 32 to the MS 10 which contains the ENL. The MS 10 stores the pilots received from the ENL as the Neighbor Set and afterwards performs the forward pilot channel F-PICH search on the Neighbor Set. The Neighbor Set in the wireless communication device may comprise at most six neighboring base stations, or at most three neighboring base stations. Other maxim um numbers of base stations are also contemplated.

The above description and illustration according to FIG. 3 assumes that the MS 10 has only one serving BS 20. However, it is understood that the MS 10 could be in soft handoff with multiple cells. If the MS 10 is in a soft handoff where multiple cells are simultaneously communicating with the MS 10, the BSC 31 provides a copy of the NLUM to each BS simultaneously communicating with the MS 10. This will be discussed in more detail below relative to FIG. 4.

To update the ENL for the MS 10 effectively, each BS 21–26 in the NL must constantly measure the R-PICH of every MS 10 in its respective neighborhood. However, the additional signal processing required at the BS is less critical when compared with the MS because the BS is not as restricted in its power consumption and size. The extra cost for the BS to perform R-PICH estimation is converted into better F-PICH estimation at the MS 10. Using this method, the Neighbor Set size is reduced from 20 to 6 or less, which results in about a 3-fold increase in the search frequency for each pilot. The increase in search frequency for each pilot provides a significant improvement towards early detection of fast rising pilots.

With the signal processing power that the BS 20 can afford to have, the R-PICH measurements arrive at the BSC 31 with much higher frequency and accuracy than what could possibly be achieved by the F-PICH measurement at the MS 10. It is therefore possible for the BSC 31 to issue an EHDM 20b, 21b, 22b, 23b, 24b, 25b, 26b autonomously based on its analysis of the R-PICH data without having to wait for the PSMM from the MS 10. This will effectively shorten the turn around time of the soft handoff procedure reducing the chance of link failures due to the system's delayed reaction to the channel variation.

The R-PICH-measurement-triggered soft handoff mechanism can be. used in combination with the existing F-PICH measurement-triggered soft handoff to ensure the quality of both forward and reverse links.

In the existing algorithm, after the MS 10 receives the NL from the BS 20, it follows a certain schedule in performing the F-PICH search without much intervention from the BS 20. The MS 10 only sends the PSMM when a certain pilot passes the threshold test, which may be too late in some cases given that the MS 10 has to track more than one pilot. Having a much higher signal processing power, the BSC 31 is capable of applying more sophisticated channel estimation and prediction techniques on the R-PICH data, and thus provide guidance for the MS 10 to search F-PICH intelligently according to the method and apparatus of the present invention.

The structural embodiment of the invention is also illustrated by FIG. 3. A wireless communication network 34 comprises at least one BS 20 acting as a serving cell 20a for a MS 10, or wireless communication device. The serving BS 20 stores a list of neighboring cells 21a, 22a, 23a, 24a, 25a and 26a which comprise base stations 21, 22, 23, 24, 25 and 26 which are adjacent to or near the serving BS 20. A BS controller 31 compiles an ENL from the neighboring cells 21a, 22a, 23a, 24a, 25a and 26a to the serving cell 20a based on the monitored reverse channel signal strength from the MS 10. The BS controller 31 transmits the effective neighbor list 30 to the serving BS 20. The serving BS 20, or base stations, will periodically transmit a Neighbor List Update Message 32 to the MS 10, which will then update its Neighbor Set based on the effective Neighbor List.

Figure 4:
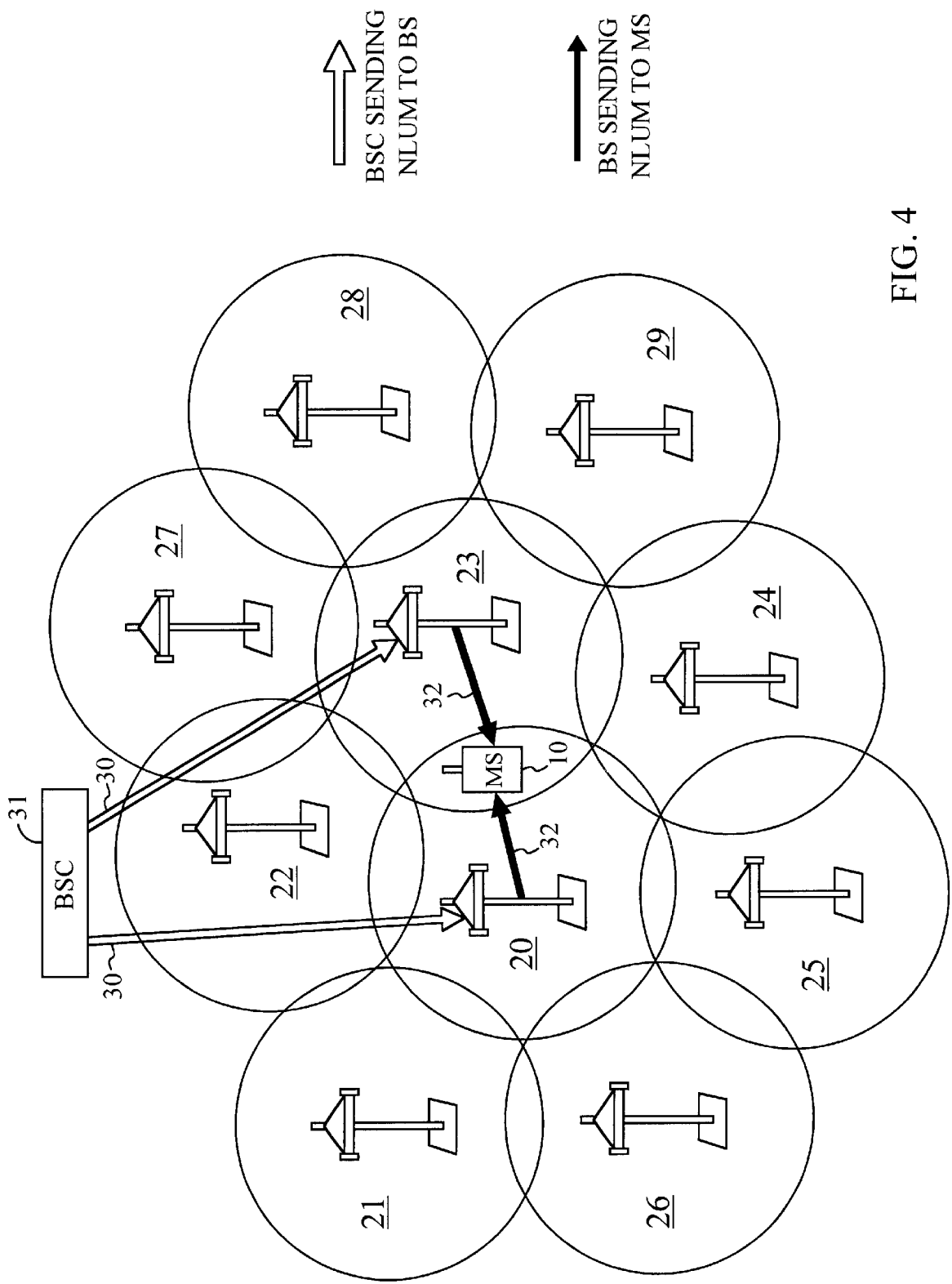
FIG. 4, illustrates the present invention wherein two base stations are serving the MS simultaneously.

FIG. 4 illustrates the preferred embodiment of the invention during a soft handoff operation where two base stations 20, 23 are simultaneously communicating with the MS 10. For simplicity, some of the communication lines shown in FIG. 3 are omitted from FIG. 4, such as the lines representing the communication between the MS 10 and the neighboring base stations and the line representing the communication from the base stations to the BSC 31. Similarly, only one reference number, i.e., 21, will refer to the BS, the cell containing that particular BS, and any communication to or from that BS.

In FIG. 4, the MS 10 is simultaneously communicating with BS 20 and BS 23. The method for optimizing the NL comprises establishing a call between a MS 10 and BS 20 and BS 23, which each have a stored NL of its respective neighboring cells. For BS 20, the neighoring list of cells comprises cells 21, 22, 23, 24, 25 and 26. For BS 23, the neighboring list of cells comprises 20, 22, 27, 28, 29, and 24. The BSC 31 separately informs all the cells in the respective NL to monitor the R-PICH signal strength of the MS 10 and report it to the BSC 31. Accordingly, each cell in the NL of BS 20 transmits the R-PICH data to the BSC 31 and each cell in the NL of BS 23 transmits the R-PICH data to BSC 31. The BSC 31 processes the R-PICH measurements from the respective NL members and compares the respective R-PICH data with a pre-determined threshold, which preferrably is lower than T_ADD. The pre-determined threshold may also be some other pre-determined value unrelated to T_ADD.

Based on the analysis of the R-PICH data, the BSC 31 compiles a separate ENL for each BS 20, 23 consisting of those base stations that report sufficiently strong R-PICH measurements from the MS 10. The threshold levels for what is determined to be "sufficiently strong" are determined based on various factors known to those of ordinary skill in the art. The BSC 31 transmits the BS 20 ENL data to BS 20 and the BS 23 ENL data to BS 23, each of which is serving the MS 10. Periodically, BS 20 transmits to the MS 10 a NLUM 32 which contains the corresponding ENL. Also periodically, BS 23 transmits to the MS 10 its respective NLUM 32. The MS 10 stores the pilots received from the respective ENLs in the Neighbor Set and performs the F-PICH search accordingly using the Neighbor Set after storing the ENL as the Neighbor Set.

To update the respective ENLs for the MS 10 effectively, each BS in the NL of BS 20 and BS 23 must constantly measure the R-PICH of every MS 10 in the respective neighborhood. Using this method, the Neighbor Set within the MS may be reduced from 20 but may also be modified to accommodate two sets of ENLs in its Neighbor Set. For example, if BS 20 and BS 23 each transmit an NLUM containing their respective ENLs, the MS 10 may have a Neighbor Set defined to receive 12 pilots.

As a variation of this method, the BSC 31 may further refine each respective ENL based on data compiled from each set of neighboring base stations to either the BS 20 or the BS 23. In this scenario, the BSC 31 will transmit a combined ENL to each of BS 20 and BS 23. Therefore, when the NLUM is transmitted to the MS 10 from each of BS 20 and BS 23, the contained ENL will be refined and optimized for the MS 10. The Neighbor Set may still be reduced from 20 to 6 or less, which results in about a 3-fold increase in the search frequency for each pilot.

Similar to the embodiment shown in FIG. 3, with the signal processing power that the BS 20 can afford to have, the R-PICH measurements arrive at the BSC 31 with much higher frequency and accuracy than what could possibly be achieved by the F-PICH measurement at the MS 10. It is therefore possible for the BSC 31 to issue an EHDM to a respective BS autonomously based on its analysis of the R-PICH data without having to wait for the PSMM from the MS 10.

The R-PICH-measurement-triggered soft handoff mechanism can be used in combination with the existing F-PICH measurement-triggered soft handoff to ensure the quality of both forward and reverse links.

Returning to FIG. 3, in the IS-95 A/B and cdma2000 algorithms, after the MS 10 receives the NL from the BS 20, it follows a certain schedule in performing the F-PICH search without much intervention from the BS 20. The MS 10 only sends the PSMM when a certain pilot passes the threshold test, which may be too late in some cases given that the MS 10 has to track more than one pilot. Having a much higher signal processing power, the BSC 31 is capable of applying more sophisticated channel estimation and prediction techniques on the R-PICH data, and thus provide guidance for the MS 10 to search F-PICH intelligently according to the method and apparatus of the present invention.

While the structure necessary to practice the invention is disclosed herein, one Of ordinary skill would readily understand what other structures and components would be used to practice the invention, such as equipment for switching, call routing, and so forth. Furthermore, the terms "cell" and "base station," while not the same thing, are often interchangeable in the above description. ABS is the transmitting/receiving unit and its effect range or capability to communicate with a MS defines the "cell." Therefore, a neighboring "cell" to a serving "cell" will contain a corresponding neighboring BS to a serving BS. When referring to a neighboring cell, such a term may also mean the neighboring BS, or a pilot signal from the neighboring BS contained in the respective neighboring cell.

In another embodiment of the invention, the BSC 31 prioritizes the ENL using the results of a channel prediction process so that the MS 10 can concentrate its searcher power on pilots with a higher likelihood to be the handoff candidate.

In yet another embodiment of the present invention in which the BS 20 directs the F-PICH search involves the BS 20 sending a message ordering the MS 10 to report the F-PICH strength of a certain set of pilots that are under consideration for handoff. With both the F-PICH and R-PICH data available, the BSC 31 can direct the MS 10 to make a better handoff decision. The present inventors contemplate that within the scope of the concepts disclosed above, one of ordinary skill in the art would understand that there may be variations of the above embodiments which involve optimizing the Neighbor Set to increase the efficiency of the soft handoff.

By combing the information from the F-PICH and R-PICH measurements and taking advantage of the signal processing power at the BS, the proposed handoff algorithm promises to improve efficiency of existing handoff algorithms. One measure of the efficiency improvement is the ability to perform an early and quick handoff as a benefit from the dynamically optimized NL and the inclusion of autonomous EHDM. Another measure of the efficiency is the ability to make better handoff decisions as a result of using more sophisticated signal processing techniques at the BS and the possibility of BS-directed intelligent search at the MS 10. Such improved handoff efficiency is particularly crucial to the third generation system, where a link failure may cause the loss of multiple applications and each bad handoff decision will incur a large cost in terms of network resources.

The present invention provides numerous benefits over the prior art. The time which it takes to accomplish a handoff is reduced, which is a measure of the reaction speed to fast rising pilots. The average size of the Active Set can be reduced, which is a measure of the network resources usage in terms of physical channels. The frequency of handoff can be reduced, which is a measure of the handoff decision validity and the network resource usage in terms of signaling overhead. Finally, the combined Active Set pilot strength is increased, which is a measure of radio link quality.

Although the description above contains many details, these should not be construed as limiting the scope of the invention but as merely providing illustrations of the presently preferred embodiment.

What is claimed is:

1. A method of handing off a wireless communication device between at least one serving base station and a receiving base station in a wireless communication system comprising:
    (a) establishing a call between the wireless communication device and the at least one serving base station;
    (b) monitoring a signal received from the wireless communication device by at least one base station neighboring the serving base station;
    (c) compiling a list of effective neighboring base stations from the at least one neighboring base station based on the monitored wireless communication device signal; and
    (d) monitoring the signals received at the effective neighboring base stations to accomplish a handoff between the at least one serving base station and the receiving base station, and
    (e) transmitting an extended handoff direction message from the base station controller to the wireless communication device autonomously,
    wherein monitoring the signal received from the wireless communication device by at least one neighboring base station includes monitoring the reverse pilot channel signal strength received from the wireless communication device,
    wherein compiling the list of effective neighboring base stations is further based on the monitored wireless communication device reverse pilot channel signal strength,
    wherein the list of effective neighboring base stations includes base stations neighboring the at least one serving base station which receive the wireless communication device signal at a predetermined strength,
    wherein transmitting the extended handoff direction message is based on the base station controller analysis of the wireless communication device signal strength detected by each neighboring base station and independent of the pilot strength measurement message generated by the wireless communication device, and
    wherein transmitting the extended handoff direction message based on the wireless communication device signal strength detected by each neighboring base station is performed in combination with issuing an extended handoff direction message based on a pilot strength measurement message generated by the wireless communication device.

2. A method of handing off a wireless communication device between at least one serving base station and a receiving base station in a wireless communication system comprising:
    (a) establishing a call between the wireless communication device and the at least one serving base station;
    (b) monitoring a signal received from the wireless communication device by at least one base station neighboring the serving base station;
    (c) compiling a list of effective neighboring base stations by the at least one neighboring base station based on the monitored wireless communication device signal;
    (d) monitoring the signals received by the effective neighboring base stations to accomplish a handoff between the at least one serving base station and the receiving base station;
    (e) transmitting to a base station controller the wireless communication device signal strength detected at each neighboring base station;
    (f) compiling the list of effective neighboring base stations at the base station controller;
    (g) transmitting the list of effective neighboring base stations to each at least one serving base station;
    (h) periodically sending a neighboring base station list update message to the wireless communication device, the neighboring base station list update message including the effective neighboring base station list;
    (i) updating a neighbor set according to the neighboring base station list update message in the wireless communication device; and
    (j) performing forward channel signal strength searching of the neighbor set in the wireless communication device after storing the effective neighbor list as the neighbor set.

3. The method of claim 2, wherein the neighbor set in the wireless communication device comprises at most six neighboring base stations.

4. The method of claim 2, wherein the neighbor set in the wireless communication device comprises at most three pilots of neighboring base stations.

5. The method of claim 2, wherein transmitting the list of effective neighboring base stations to each at least one serving base station is performed by a base station controller which updates the neighbor set using a neighbor list update message including the list of effective neighboring base stations to each at least one serving base station.

6. The method of claim 5, further comprising transmitting the effective list of neighboring base stations from the at least one serving base station to the wireless communication device.

7. The method of claim 6, wherein updating the neighbor set comprises the wireless communication device storing the effective neighboring base station list as the neighbor set.

8. A method of handing off a wireless communication device between a plurality of serving base stations and at least one receiving base station in a wireless communication system comprising:

(a) establishing a call between the wireless communication device and the plurality of serving base stations;

(b) monitoring the signal strength on the reverse channel received by at least one base station that is a neighbor to any one of the plurality of serving base stations;

(c) compiling a list of effective neighboring base stations corresponding to each of the plurality of serving base stations; and (d) monitoring the signals received by the effective neighboring base stations to accomplish a handoff between the plurality of serving base stations and at least one of the receiving neighboring base stations;

(e) transmitting to a base station controller the strength of the signals received from the wireless communication device, the signal strength having been detected at each base station neighboring the plurality of serving base stations;

(f) transmitting the respective list of effective neighboring base stations to each of the plurality of serving base stations;

(g) periodically sending a neighboring cell list update message from each of the plurality of serving base stations to the wireless communication device, each of the neighboring base station list update messages from the respective serving base station including the effective neighboring base station list for that respective serving base station;

(h) storing the effective neighboring base station lists as a neighbor set in the wireless communication device; and (i) performing forward channel signal strength searching of the neighbor set in the mobile station after storing the effective neighbor lists as the neighbor set, wherein the signal received from the wireless communication device is monitored by at least one neighboring base station and the lists of effective neighboring base stations includes respective base stations neighboring each of the plurality of serving base stations which receive signals from the wireless communication device at a predetermined strength.

* * * * *